Patented Nov. 2, 1926.

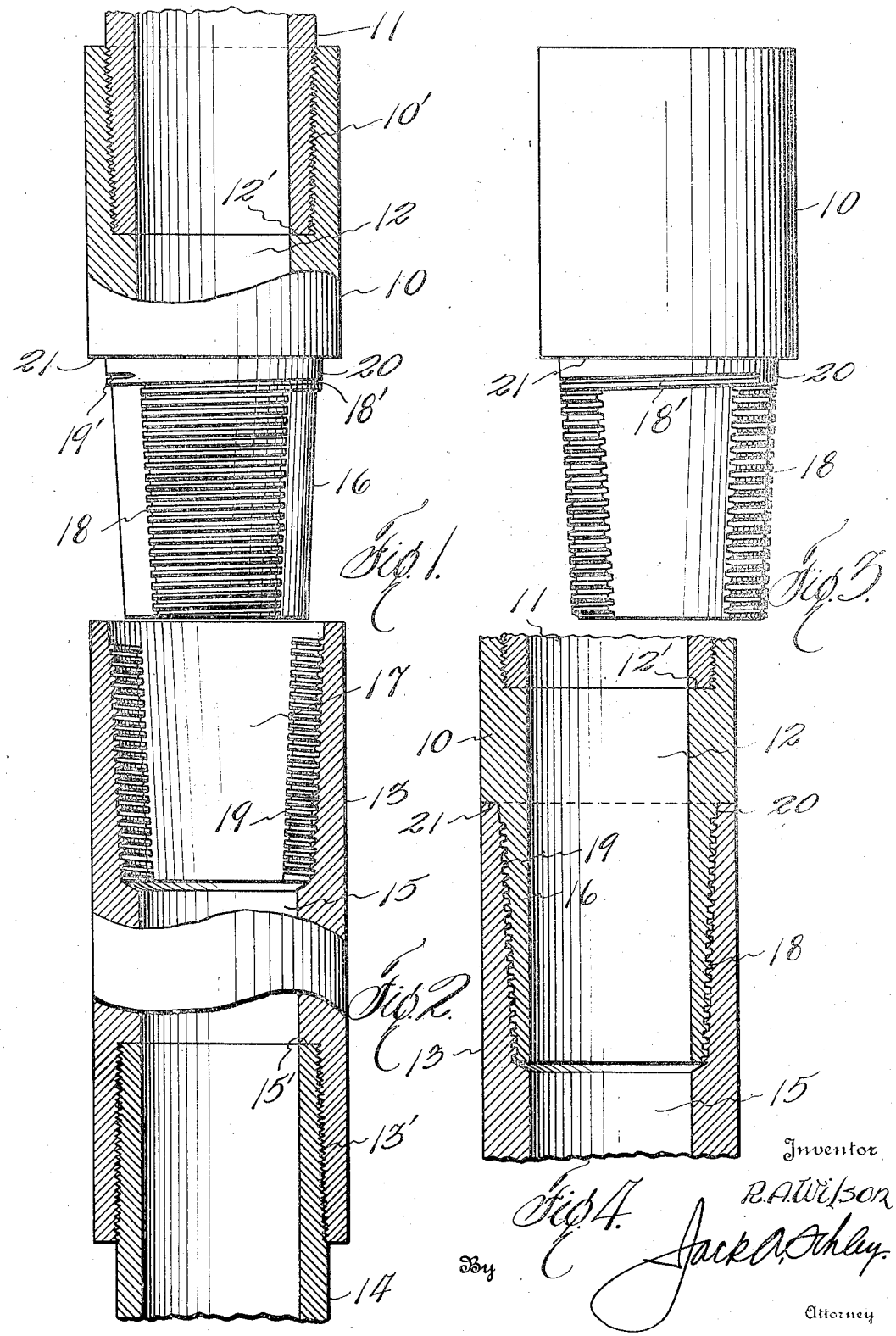

1,605,315

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

TUBULAR COUPLING.

Application filed June 23, 1924. Serial No. 721,670.

This invention relates to new and useful improvements in tubular couplings.

This application is in part a continuation of my application Serial No. 475,470 which has eventuated into Patent 1,507,877, Sept. 9, 1924, and also has to do with certain improvements therein.

The invention relates particularly to couplings of the box and pin type, such as tool joints for connecting the drill pipe of a rotary well drilling rig.

The object of the invention is to utilize the quick coupling and uncoupling features of the invention disclosed in the aforesaid application and to locate the continuous threads at the upper end of the pin instead of at the bottom of the box.

An advantage of the improvement is that the continuation threads may be cut on the exposed surface of the pin, thus making the box more simple to produce.

Another object is to provide a box and pin having thread panels for quick coupling and uncoupling, whereby a less taper may be employed and a passage through the box and pin having the same diameter as that of the tubing, may be obtained.

A further object is to provide an annular collar at the top of the pin in which the continuations of the threads may be cut and which permits the forming of an annular shoulder and a tight fit in the upper end of the box.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a pin member constructed in accordance with my invention, Fig. 2 is a view of a box constructed in accordance with my invention, a portion being shown in section, and the box being located to receive the pin of Fig. 1, Fig. 3 is an elevation of the pin at right angles to Fig. 1, and Fig. 4 is a vertical sectional view of the coupling assembled.

In the drawings the numeral 10 designates a pin member which has a screw threaded socket 10' at its upper end to receive the screw threaded end of a well drilling pipe, tubing or other tubular conductor 11, with which the joint is used. The socket and threaded end are slightly tapered and the threads are comparatively fine with relation to the threads of the pin. The member has a longitudinal axial bore 12, while a shoulder 12' at the bottom of the socket 10' provides for the end of the conductor 11, thus permitting the same diameter for both the bore and the conductor.

The pin member 10 constitutes one portion or element of the joint or coupling, while a box member 13 constitutes the other element or portion thereof. The box member has a screw threaded socket 13' at its lower end similar to the socket 10' for receiving the screw threaded end of a tubular conductor 14. The socket 13' has a shoulder 15' and an axial bore 15 of the same diameter as that of the conductor 14 and the bore 12. The conductor 11 is screwed into the box member 13. This structure may vary according to the use and particular conductors which are coupled. Owing to the comparatively fine screw threads of the parts they will remain engaged when the coupling is unscrewed or broken.

The member 10 is provided with a depending tapered pin 16. This pin is not tapered to the degree which has been the practice in this art, its angle of inclination to the perpendicular being much less acute than that of the pins made under Whittier Patent No. 964,353, or as is shown in my co-pending application Serial No. 475,470. By this construction the bore 12 may be given the same diameter as the conductor, whereas in the former structure the acute taper of the pin reduced the diameter about one-third. The box member has a countersunk tapering well 17 in its upper end for receiving the pin 16.

The pin is provided with mutilated threads 18 arranged in two panels, each occupying substantially one-quarter of the circumference of the pin and disposed diametrically opposite each other. This provides gaps between the panels. The panels are formed of coarse threads, the convolutions of which are preferably spaced sufficiently to admit the forming of a second of the same pitch, intermediate said convolutions. The second thread is started diametrically opposite from the first thread. From the foregoing it will be seen that one of the threads of the pin, begins at the lower end of one panel while the other thread begins at the lower end of the diametrically opposite panel. By this arrangement ample thread bearing is had and a coarse thread is available. It is within the scope of the invention to utilize a single thread.

The well 17 is provided with screw threads 19 which are mutilated and formed into diametrically opposed panels having substantially the same width as the gaps between the panels of the pin, so that the pin may be inserted in the well 17 and the threads 18 thereof, received in the gaps between the threads 19 of the box 13. It is merely necessary to insert the pin 16 in the well 17 and give the member 10, a quarter turn or rotation, whereby the threads 18 ride into the threads 19 and couple the parts of the joint together.

In order that the screw threads will properly mesh and to prevent their blunt ends from abutting and making necessary the longitudinal adjustment of the pin member, I provide means for supporting the pin when it is inserted in the well, whereby the threads are positioned in meshing relation. The threads 19 do not extend to the top of the well 17 thus leaving an annular space which receives an annular collar 20 formed at the upper end of the pin 16. An outwardly directed shoulder 21 on the member 10 overhangs the collar. This collar fits snugly in the upper end of the well and the shoulder 21 rests upon the top of the box, when the parts are screwed together.

Continuations 18' and 19' of the screw threads 18 and 19 are formed in the collar 20 at the upper ends of the panels and these thread continuations or extensions bridge the gaps between the panels of the pin 16. Thus when the pin is inserted in the well the extension 18' and 19' are supported upon the upper threads 19 of the panels of the well and guide the threads 18 between the threads 19, when the member 10 is rotated. By this arrangement no relative adjustment of the members is required to mesh the threads and a quick coupling is effected. The thread extensions terminate on opposite sides of the pin and are continuations of alternate threads.

This structure obviates the forming of the thread extensions at the bottom of the well and it is not necessary that the pin engage the shoulder at the bottom of the well, but the same principle of extending the threads across the ends of the gaps is employed as in the aforesaid application.

Various changes in the size and shape of the different parts, as well as modifications and alterations may be made within the scope of the appended claims.

What I claim, is:

1. A coupling for tubular conductors comprising in combination, a pin member, a tapered pin carried by said pin member and having screw threads arranged in opposite longitudinal panels with vertical gaps therebetween, an annular collar at the upper end of the pin, the threads at the upper end of each panel being cut into the lower portion of said collar and extended across the tops of said gaps, an annular shoulder on the member extending outwardly and overhanging the collar, a box member having longitudinal thread panels with gaps therebetween, the gaps of the box member being free from threads at its lower end, the upper end of the box receiving the collar, and the shoulder of the pin member riding on the upper edge of the box, whereby the pin is supported and its lower end is free from contact with the bottom of the box the length of the box opening being greater than the length of the thread panels of the pin.

2. A coupling for tubular conductors comprising in combination, a pin member, a tapered pin carried by said pin member and having screw threads arranged in opposite longitudinal panels with vertical gaps therebetween, an annular collar at the upper end of the pin, the threads at the upper end of each panel being cut into the lower portion of said collar and extended across the tops of said gaps, an annular shoulder on the member extending outwardly and overhanging the collar, a box member having longitudinal thread panels with gaps therebetween, the gaps of the box member being free from threads at its lower end, the upper end of the box receiving the collar, and the shoulder of the pin member riding on the upper edge of the box, whereby the pin is supported and its lower end is free from contact with the bottom of the box, the threads of the pin and box member being double, whereby the pin may be inserted with either thread panel of the pin in either gap of the box member, the length of the box opening being greater than the length of the thread panels of the pin.

In testimony whereof I affix my signature.

ROBERT A. WILSON.